(12) United States Patent
Montsinger

(10) Patent No.: US 6,258,453 B1
(45) Date of Patent: Jul. 10, 2001

(54) THERMOPLASTIC COMPOSITE MATERIALS MADE BY ROTATIONAL SHEAR

(76) Inventor: Lawrence V. Montsinger, 1837 Kilmonack La., Charlotte, NC (US) 28270

( * ) Notice: Subject to any disclaimer, the term of this patent is extended or adjusted under 35 U.S.C. 154(b) by 0 days.

(21) Appl. No.: 08/933,454

(22) Filed: Sep. 18, 1997

Related U.S. Application Data

(60) Provisional application No. 60/026,496, filed on Sep. 19, 1996.

(51) Int. Cl.$^7$ .................................................... B32B 27/12

(52) U.S. Cl. ................................... 428/298.1; 428/300.4; 428/299.4; 428/910; 264/2.1; 264/503; 264/310; 264/311; 264/312

(58) Field of Search ........................... 264/2.1, 503, 310, 264/311, 312; 428/297.4, 298.1, 300.4, 299.4, 910

(56) References Cited

U.S. PATENT DOCUMENTS

| | | |
|---|---|---|
| 2,730,455 | 1/1956 | Swann . |
| 2,820,716 | 1/1958 | Harmon et al. . |
| 2,987,419 | 6/1961 | Stein . |
| 3,150,026 | 9/1964 | Talv . |
| 3,154,908 | 11/1964 | Cliker et al. . |
| 3,608,033 | 9/1971 | Hall ...................................... 264/141 |
| 3,634,163 | 1/1972 | Lamb et al. .......................... 156/166 |
| 3,712,776 | 1/1973 | Woodham et al. ................... 425/202 |
| 3,849,154 | 11/1974 | Michael .................................... 117/4 |
| 3,873,389 | 3/1975 | Daniels ................................ 156/181 |
| 3,919,437 | 11/1975 | Brown et al. ......................... 427/113 |
| 3,956,564 | 5/1976 | Hillig ................................... 428/366 |
| 3,993,726 | 11/1976 | Moyer ................................... 264/174 |
| 4,073,974 | 2/1978 | Albarino et al. ..................... 427/163 |
| 4,169,186 | 9/1979 | Tazaki et al. ......................... 428/406 |
| 4,312,917 | 1/1982 | Hawley ................................. 428/375 |
| 4,341,822 | 7/1982 | Singer et al. ....................... 427/389.9 |
| 4,431,688 | 2/1984 | Kornman ............................... 427/310 |
| 4,439,387 | 3/1984 | Hawley ................................. 264/108 |
| 4,467,001 | 8/1984 | Coplan et al. ..................... 427/434.6 |
| 4,539,219 | 9/1985 | Yamaanishi et al. .................. 427/32 |
| 4,549,920 | 10/1985 | Cogswell et al. .................... 156/181 |
| 4,559,262 | 12/1985 | Cogswell et al. .................... 428/294 |
| 4,565,153 | 1/1986 | Corley ................................... 118/405 |
| 4,590,025 | 5/1986 | Mutterstadt et al. ................. 264/103 |
| 4,614,678 | 9/1986 | Ganga ..................................... 428/74 |
| 4,705,660 | * 11/1987 | Demarle ................................ 264/108 |
| 4,720,366 | 1/1988 | Binnersley et al. .................. 264/172 |
| 4,728,387 | 3/1988 | Hilakos ................................. 156/441 |
| 4,737,383 | 4/1988 | Matsumae ............................. 427/294 |
| 4,806,298 | 2/1989 | Wilkinson et al. .................. 264/115 |
| 4,894,105 | 1/1990 | Dyksterhouse et al. ............. 156/181 |
| 4,957,422 | 9/1990 | Glemet et al. ........................ 425/114 |
| 5,002,712 | 3/1991 | Goldman et al. .................... 264/174 |
| 5,019,450 | 5/1991 | Cogswell et al. .................... 428/402 |
| 5,108,797 | 4/1992 | Unger ................................ 427/389.8 |
| 5,158,806 | 10/1992 | Unger ................................... 427/359 |
| 5,176,775 | 1/1993 | Montsinger .......................... 156/181 |
| 5,213,889 | 5/1993 | Cogswell et al. .................... 428/332 |
| 5,268,050 | 12/1993 | Azari .................................... 156/180 |
| 5,447,793 | 9/1995 | Montsinger .......................... 428/373 |
| 5,571,583 | * 11/1996 | Cao et al. ............................. 428/910 |
| 5,725,954 | 3/1998 | Montsinger .......................... 428/397 |

* cited by examiner

*Primary Examiner*—Elizabeth M. Cole
(74) *Attorney, Agent, or Firm*—Miles B. Dearth

(57) ABSTRACT

A composite with a thermoplastic matrix and fiber reinforcement is made by rotation of an exit die about a roving of continuous fiber in the presence of a thermoplastic melt. The rotation causes opposing inner and outer helical flow conditions which reduce the melt viscosity of the polymer by shear thinning while dragging and directing the polymer into the fiber roving thereby wetting and dispersing the fiber. A composite structure is formed with a polymer rich skin and a core region of unidirectionally aligned polymer and fiber. The polymeric skin is composed of helically aligned polymer chains which are coiled by the rotation around the core to compress the core region and enhance fiber wet out.

25 Claims, 11 Drawing Sheets

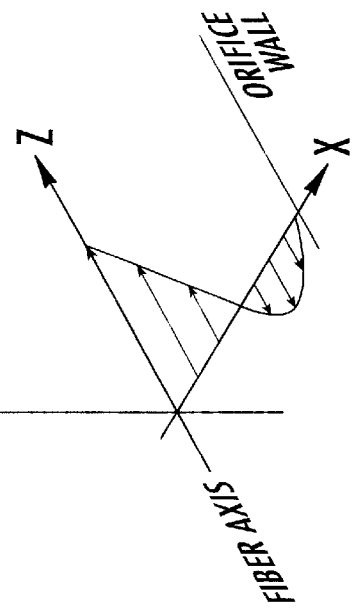
FIG. 1A. Axial drag flow from fiber
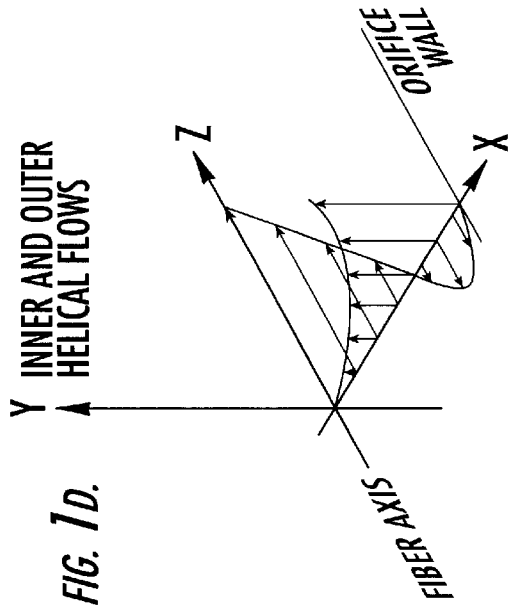
FIG. 1C. Drag flow combined with normal stress & pressure flow
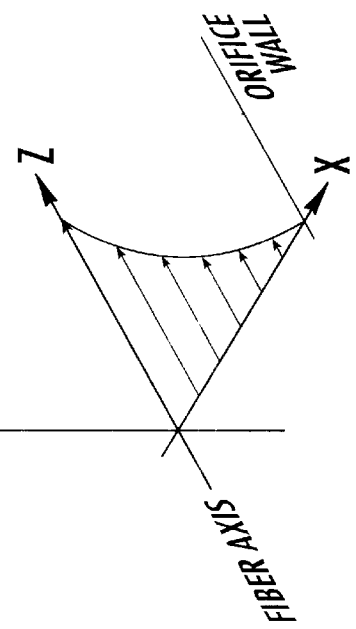
FIG. 1B. Tangent flow from rotation
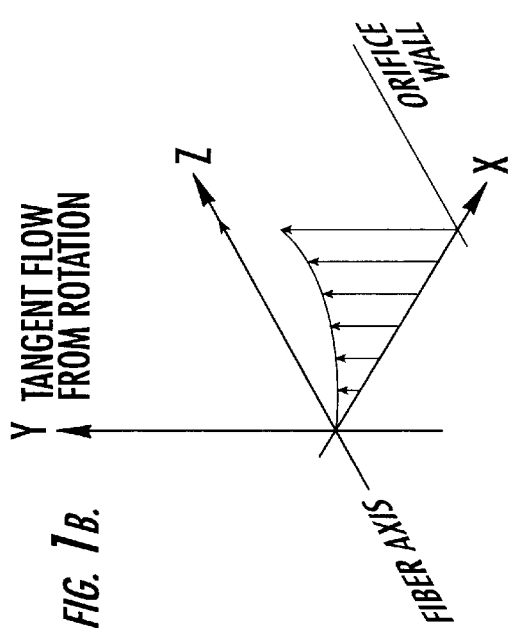
FIG. 1D. Inner and outer helical flows

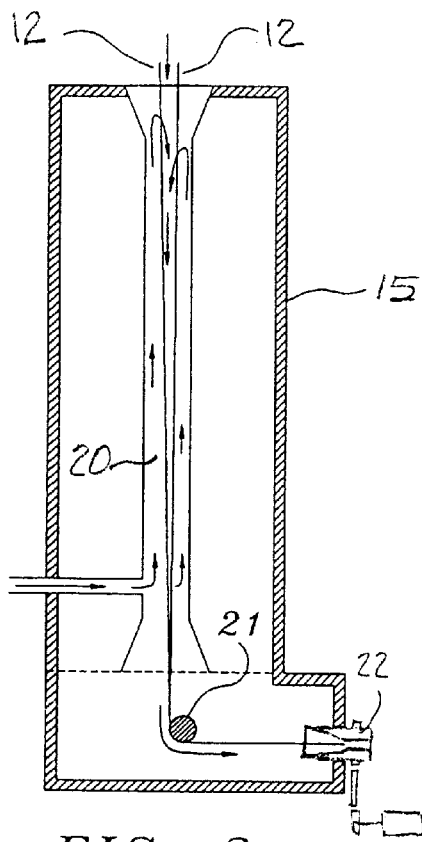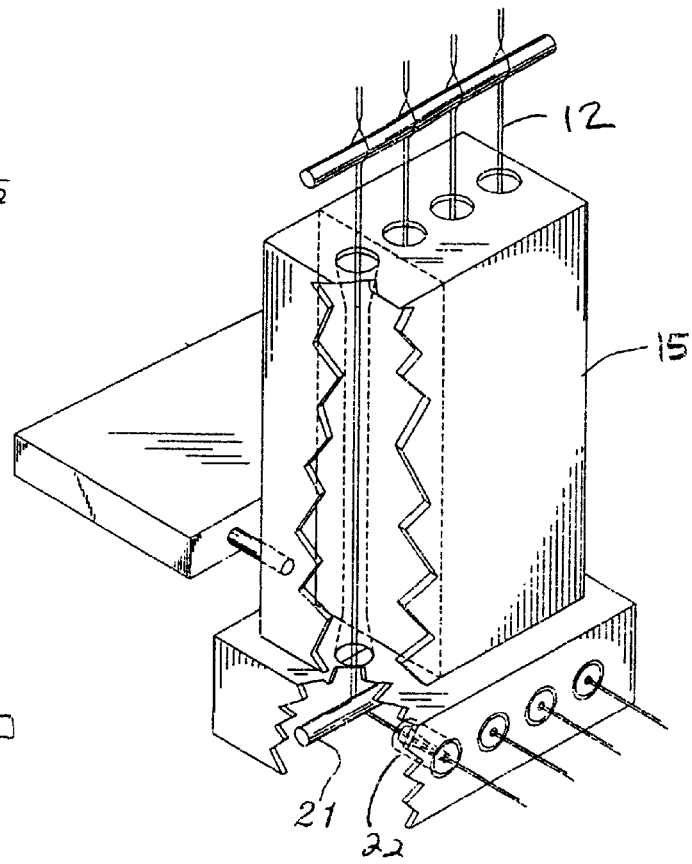
FIG. 3
FIG. 4

Fig 10
Sample 656-1 polypropylene and glass at 0 rpm.
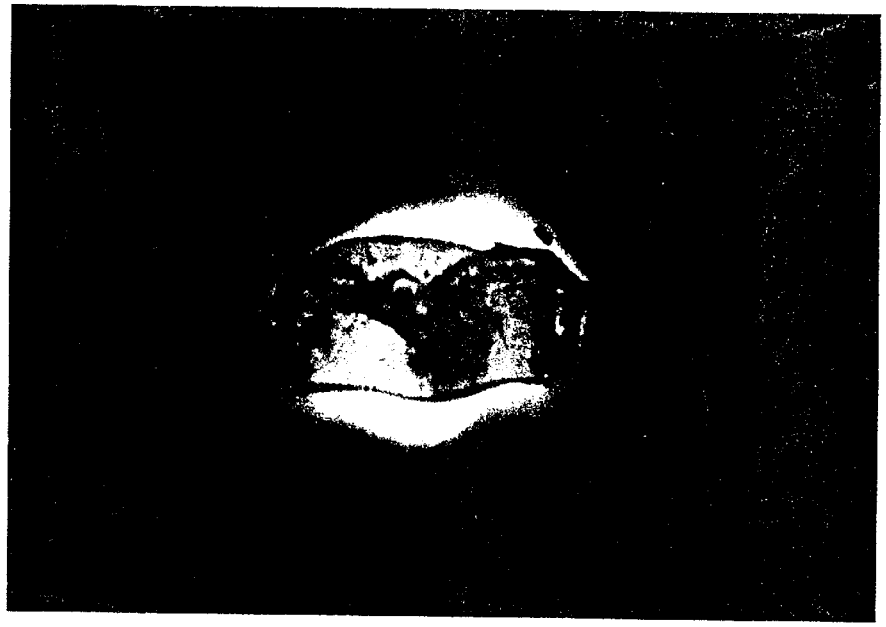
Sample 656-4 polypropylene and glass at 320 rpm.
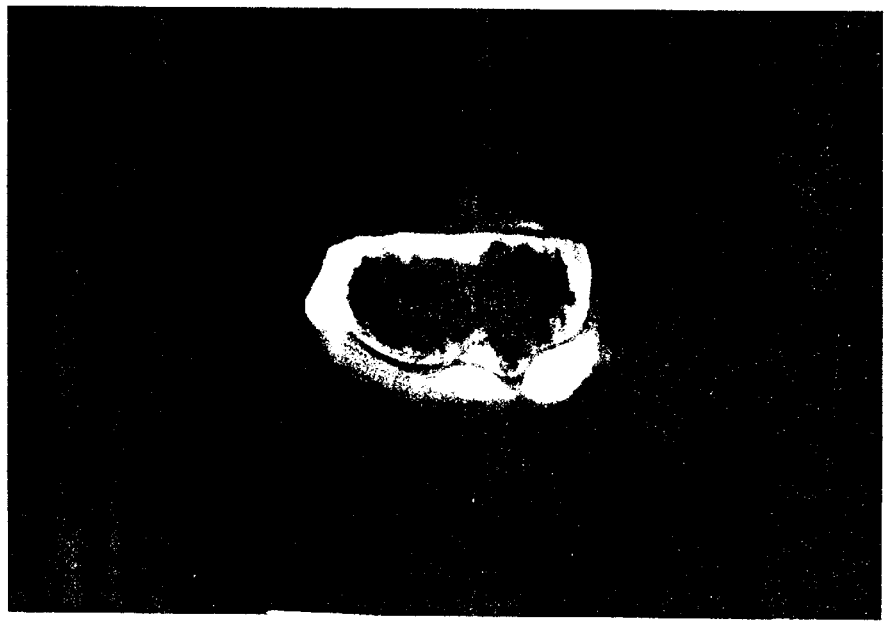
Fig 11

US 6,258,453 B1

THERMOPLASTIC COMPOSITE MATERIALS MADE BY ROTATIONAL SHEAR

CROSS REFERENCE TO RELATED APPLICATIONS

This application is related to commonly owned copending provisional application Ser. No. 60/026,496 filed Sep. 19, 1996, and claims the benefit of its earlier filing date under 35 U.S.C. § 119(e).

FIELD AND BACKGROUND OF THE INVENTION

This invention relates to composite materials formed by thermoplastic resins and reinforcing fibers. More particularly, this invention relates to such composite materials and the process to form such materials, where the thermoplastic and fiber components impart great strength and commercial utility to the composite compared with materials made previously to this invention.

The forming of composite materials using polymers and fibers has been known heretofore, and the processes, methods, apparatus, and products relating to such composites are disclosed in the patents of Montsinger (U.S. Pat. No. 5,176,775) and Cogswell (U.S. Pat. No. 4,541,884). The difficulties of wetting fiber with high viscosity thermoplastic resins are well understood. Montsinger in '775 discloses a method of counter current flow between polymer and continuous fiber roving to increase shear and lower viscosity of thermoplastic resin. Cogswell relies on low viscosity polymers.

SUMMARY OF THE INVENTION

The present invention produces high strength, composite materials with thermoplastic polymer and reinforcing fiber. The thermoplastic polymer may have a high molecular weight resulting in a high viscosity. The fiber may be continuous rovings of glass, carbon, metal, and/or organic filaments. The commercial products of this invention may include long fiber reinforced thermoplastic compounds which are reformable and injection molding pellets. Injection molding pellets have a fiber length equal to the pellet length, generally about 0.5 inches, and also have a generally circular cross section with an aspect ratio (length/diameter) greater than 1. Another product of this invention is continuous fiber reinforced thermoplastic profiles which have a constant shape such as a round rod and may be advantageously used in structural applications in place of metal because of the relative low weight and high strength.

The polymer and fiber composite materials are produced in a fiber melt impregnation process in which continuous filament fiber is contacted with molten polymer and extruded or pultruded through a die orifice. In such a process, the exit orifice size of the die usually determines the fiber loading of the composite. For example, increasing the exit area allows more polymer to pull through the die with a given fiber amount thereby lowering the fiber concentration. According to the present invention, relative rotation is imparted between the exit die and the advancing polymer impregnated fiber. The relative rotation can be achieved, for example, by rotating the exit die about the axis of the advancing fibers. This produces an unexpected increase in the fiber concentration and the benefit of improved strength of the composite compared to products made without rotation.

The exit die, preferably having a conical entrance and cylindrical exit, is rotated about the axially directed rovings of continuous fiber. Polymer melt is conveyed by pressure flow and/or fiber drag flow into the orifice chamber. The rotation of the conical chamber wall induces a conihelical flow path for the polymer due to viscous drag from wetting of the wall by the polymer in addition to the axial drag by the fiber. The polymer flow path becomes helical in the cylindrical region of the rotating orifice chamber. The difference in velocities and directions between the polymer and fiber moving in an axial direction and the polymer moving in a vortiginous, conihelical direction give rise to a dispersive and impregnative shear to wet out fiber with polymer. In addition the polymer chains are coiled around the reinforcing, axially directed fiber and bound polymer to create a normal stress effect of polymer backflow. The velocity distributions are represented in FIG. 1 as described in more detail below.

The present invention thus provides a method of producing a fiber reinforced thermoplastic material which comprises directing continuous filaments along a predetermined advancing path of travel into and through an impregnation chamber. Molten thermoplastic polymer material is injected from an extruder into the impregnation chamber and into intimate contact with the advancing filaments for wetting and impregnating the filaments with the thermoplastic material. The filaments are then pulled through the exit die from the exit end of the impregnation chamber while the exit die is rotated about the axis of the advancing filaments.

The present invention also provides an apparatus for producing a fiber reinforced thermoplastic material, the apparatus including an impregnation chamber having an entrance end and an exit end. The exit end includes an exit die having a die opening. Means are provided for directing continuous filaments along a predetermined advancing path of travel into and through the impregnation chamber so that the filaments enter through the entrance end and exit through the exit die. An extruder provides a supply of molten, thermoplastic polymer. Means is provided for directing the molten thermoplastic material from the extruder into the impregnation passageway and into intimate contact with the filaments. This promotes wetting and impregnation of the filaments with the molten thermoplastic polymer. Means are provided for rotating the exit die about the axis of the filaments.

A fiber reinforced thermoplastic composite produced with this process and apparatus has a unique structure with a core region and a skin region. The size of each region is related to the pulling speed and orifice rotation speed. The skin is composed only of polymer. Rotation of the orifice reduces the volume of polymer in the skin by contributing to the core region and normal stress polymer backflow. The core is composed of unidirectionally aligned fibers which are fully impregnated with the matrix thermoplastic polymer. The core polymer appears to be more crystalline than the skin polymer probably because of slower, internal cooling. The polymer chains in the core are aligned with the fiber by the fiber drag. The skin is oriented by the helical flow alignment of the polymer chains. Shear strength measurements of composite strands showed greater strength with increasing rotation speed at a given line speed and fiber concentration. Inner laminar shear strength of the composite was also improved.

BRIEF DESCRIPTION OF THE DRAWINGS

The foregoing and other objects, features, and advantages of the present invention will be made apparent from the following detailed description of the preferred embodiment of the invention and from the drawings, in which:

FIGS. 1A–1D are graphical illustrations of the polymer drag flow when a composite material is formed according to the present invention;

FIG. 3 is a cross-sectional view of the impregnating chamber of the apparatus;

FIG. 4 is a fragmentary perspective view of an alternative embodiment of apparatus adapted for processing multiple fiber strands simultaneously;

FIGS. 10 and 11 are photographs of a cross section of composite material under polarized light.

DETAILED DESCRIPTION OF THE INVENTION

Figure 2:
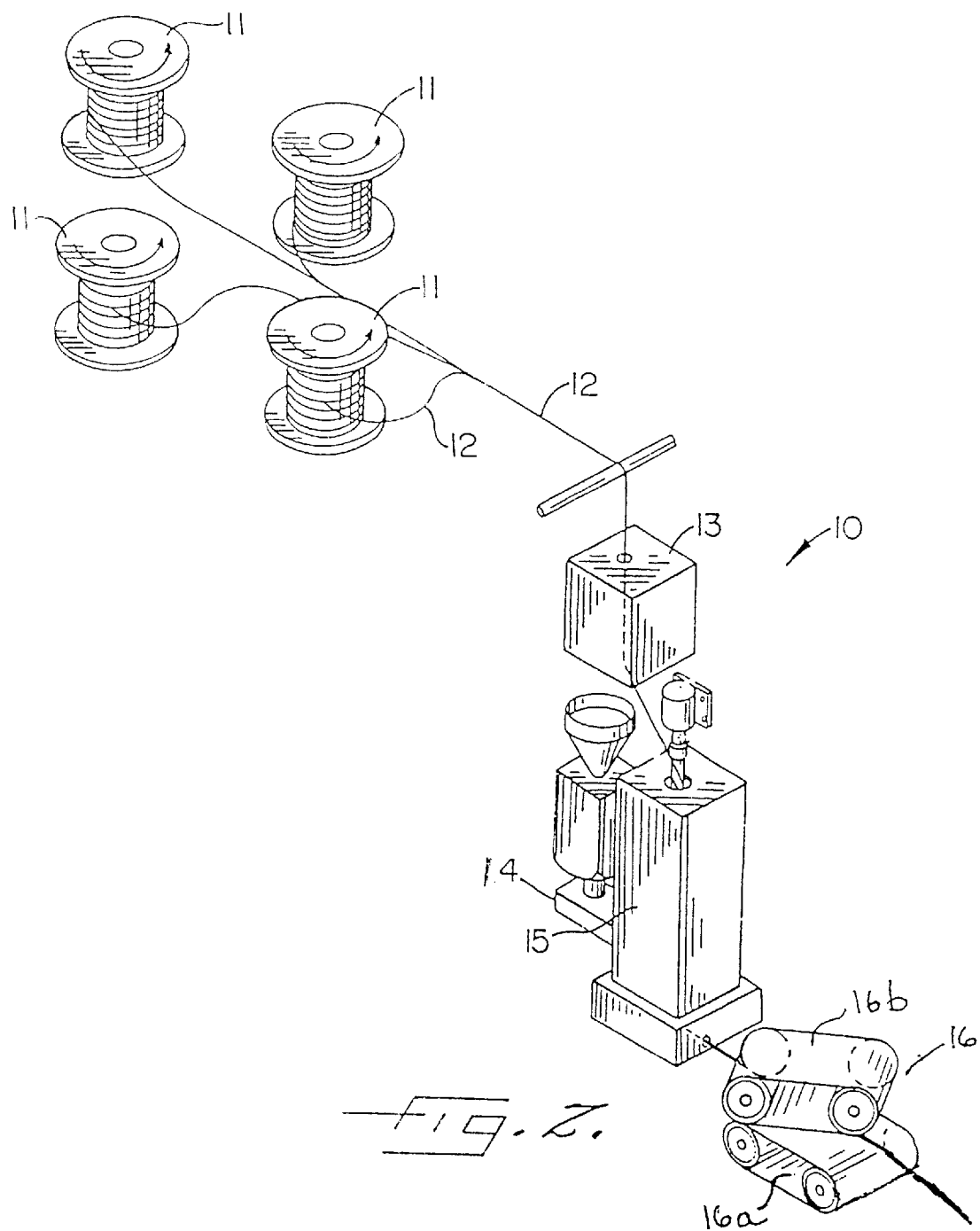
FIG. 2 is a schematic illustration of an apparatus for producing a fiber reinforced composite according to the present invention.
Figure 5:
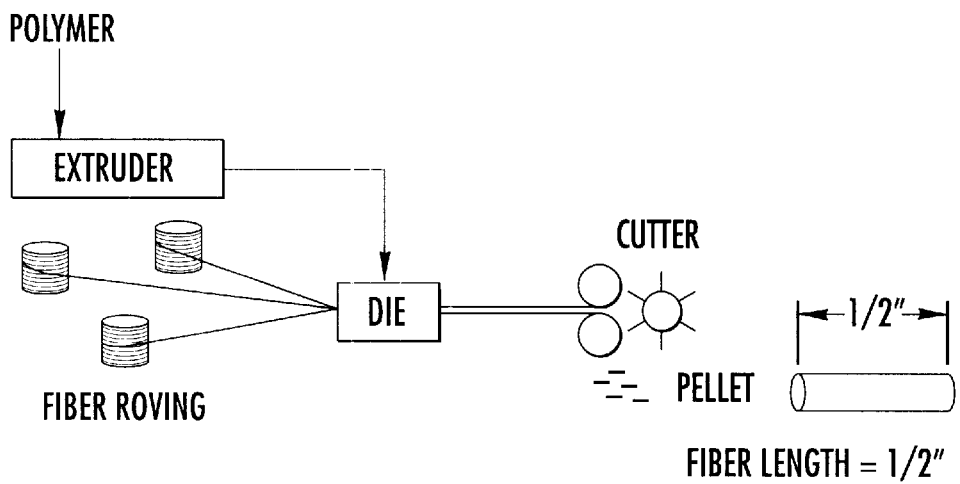
FIG. 5 is a schematic representation of a process in accordance with the present invention.

The present invention will now be described more fully with reference to the accompanying drawings, in which preferred embodiments of the invention are shown. The invention should not, however, be construed as limited to the specific embodiments set forth herein. The specific embodiments are provided so that this disclosure will be thorough and complete and will fully convey the scope of the invention to those skilled in the art.

The process according to the present invention combines drag flow from the fiber pulling the polymer through the exit die with conihelical and helical drag flow due to the exit die rotation. Pressure flow may also exist due to exit die restriction creating back flow. The combination of opposing inner, forward and outer backward helical and conihelical flows servers to lower viscosity and to increase the wet out of fiber by the polymer.

In FIG. 1A, the axial drag flow z of polymer by the fiber is represented. The polymer flow velocity is highest at the fiber and diminishes out to the exit die wall (since the wall has no velocity in the z direction). In FIG. 1B the tangent flow created by the exit die rotation is shown. FIG. 1C shows the drag flow combined with the resulting normal stress back flow as the polymer is squeezed around the fiber. Finally, FIG. 1D shows the combined velocity distributions of the drag, tangent, and normal stress pressure flows that exist when the process is operating to produce the inner forward (+y,+z) and outer backward (+y, −z) helical and conihelical flows.

The apparatus according to the present invention incorporates some of the features of the apparatus according to U.S. Pat. Nos. 5,176,775 and 5,447,793, to Lawrence V. Montsinger, which are fully incorporated herein by reference. The apparatus, generally indicated at 10 in FIG. 2, has fiber supply means 11, preferably in the form of a creel mounting a plurality of packages of fiber material for supplying continuous filament fiber 12; advancing means for advancing the fiber 12 from the creel along a predetermined path of travel; a heater 13 disposed along the predetermined path of fiber travel for heating advancing fiber to a predetermined elevated temperature; an extruder 14 for supplying molten, heated thermoplastic material and an impregnation chamber 15 disposed along the predetermined path of fiber travel and connected to the extruder 14 for receiving a flow of molten heated thermoplastic material. The thermoplastic material is directed through the impregnation chamber in a direction opposite to that of the advancing fiber so that it impregnates and surrounds the advancing heated fiber. Shear forces arising between the advancing heated fiber and the flow of thermoplastic material promote wetting of the fiber by and impregnation of the fiber by the thermoplastic material.

As best illustrated in FIG. 3, fibers 12 enter the upper end of the impregnation chamber 15 and are guided along a vertical impregnation passageway 20. As the fibers advance along their path, thermoplastic material from the extruder passes to the vertical impregnation passageway. The passageway 20 is arranged for downward passage of fibers 12 therethrough and for upward movement of thermoplastic material and is heated by appropriate means. The counter-movement gives rise to shear forces between the advancing heated fiber and the directed flow of thermoplastic material which, in accordance with this invention, promote wetting of the fiber by an intimate impregnating enclosure of the fiber and the thermoplastic material. Additionally, the path along which the fiber 12 is guided within the impregnation column 20 is such as to cause the thermoplastic material entrained in downward movement to be squeezed between the fibers.

At the foot of the column 20, the continuous filament fibers 12 are passed about a single turning guider bar 21 which thereby requires that the fibers come to a single plane. The gradual converging of the fibers moving downwardly force the molten thermoplastic material into the space between the filaments and then squeezes the thermoplastic material into intimate contact with the fibers, assisting in assuring wetting of the fibers with the thermoplastic. Continuous fiber is pulled through an orifice in the form of an exit die 22 as a band, web, tow, or roving. The exit die 22 diameter regulates the amount of polymer that is pulled out of a die by the fiber. The exit die area controls the polymer to fiber ratio.

Figure 6:
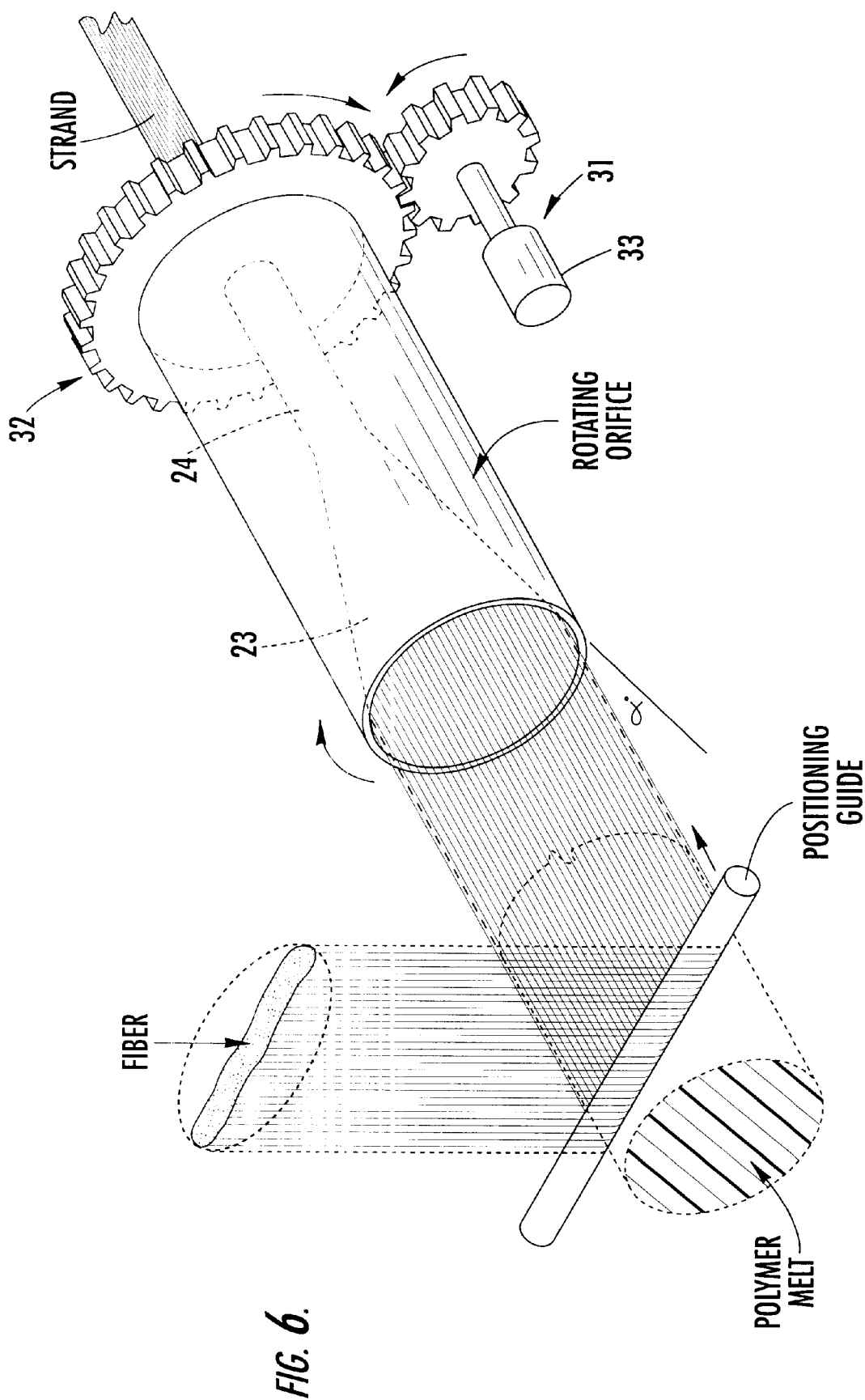
FIG. 6 is an enlarged fragmentary schematic view showing the passage of filaments through the exit die orifice.
Figure 7:
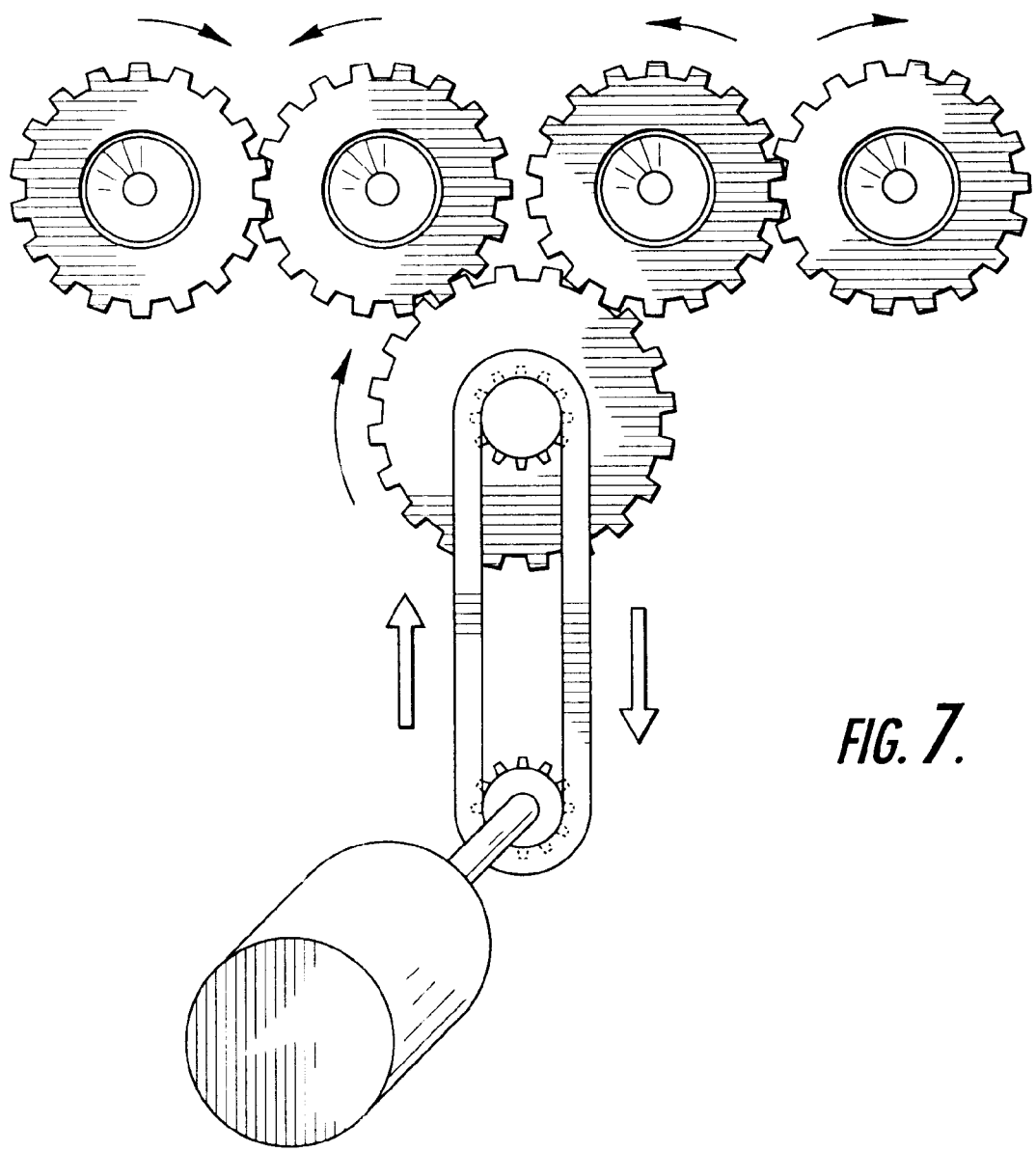
FIG. 7 is an enlarged illustration of the gear mechanism for rotating the exit die according to an alternative embodiment.

The exit die 22 is shown generally in FIG. 3 and is shown in more detail in FIGS. 6 and 7. As shown in FIG. 6, the exit die includes a conical entrance end 23 and a exit end 24 with a cylindrical bore. More specifically, the conical entrance 23 is frustoconical and tapers to meet the cylindrical exit 24 portion. The conical region 23 of the exit die 22 forms a vortiginous flow path due to drag by the exit die surface when the exit die is rotated. The conical region 23 may have a conihelical, heliconical, or helicoidal shape. The portion of the exit die 22 in which the diameter is constant forms a cylinder and creates a helical flow path when the exit die rotates. A right hand or left hand helix length is defined by the hypotenuse of the circumference and the lead (land length). Increasing the length of the cylindrical portion 24 simulates the effect of reducing line speed which reduces the pitch and improves the product in terms of wet out, shear strength, etc. The length/diameter ratio may be varied from 0.01 to 1000 and, preferably, from 4.4 to 10.6.

As to the conical portion 23 of the exit die 22, the tapered angle thereof may range from 0 to 90 degrees, preferably from 5 to 10 degrees. An angle within the range of 4 to 6 degrees has been found useful for certain applications. A smaller angle requires a longer taper length for the cone region. The total angle formed is generally two times the taper angle. Changing the taper angle changes the conihelical velocity relative to the linear velocity in the pulling direction. The conservation of angular momentum about a fixed axis requires a change in velocity which implies an acceleration constant. Velocity is another term for shear rate, therefore the taper offers a constant change in shear rate.

The surface energies of the exit die and polymer determine the amount of polymer drag (or friction flow) by the exit die rotation. A high coefficient of friction (rough surface) is desirable. A range from 0.1 to 1.0 is desired. Patterns may be cut into the exit die surface (such as a screw thread) which may influence the flow path of the polymer. Other methods to influence the polymer flow path and/or create turbulence to wet out fiber may include directional jets to inject polymer into a vortex.

Fiber may spread to a width greater than the exit die entrance or exit diameter due to the rotational drag. The spread is in multiple dimensions. As the fiber brushes against the exit die wall, opposition to the rotational drag may create a pressure gradient for polymer to penetrate the fiber bundle.

According to the illustrated embodiment, the exit die 22 rotates about the axis of the advancing fibers 12. The exit die is rotated by a suitable drive assembly, such as intermeshing gears 31, 32 and motor 33, as illustrated in FIG. 6. The positioning guide 21 directs the fibers 12 into the high shear peripheral zone of the exit die wall. The positioning guide 21 also prevents the fiber from twisting before wet out. However, some twisting after wet out may desirably squeeze polymer through the filaments to enhance wet out. Thus, according to an optional aspect of the invention, the polymer impregnated filaments may be rotated at a location downstream from the exit die 22 by a suitable device, such as by the canted puller belt system 16 as illustrated in FIG. 2, which includes a pair of drive belts 16a, 16b mounted at an angle to one another. Rotation of the filaments causes twist to back up into the die, thus imparting relative rotation between the advancing polymer impregnated filaments and the die surface. The die may be stationary in this instance or may be rotated in the same or opposite direction as the filaments.

Rotating the exit die around the fiber and also optionally rotating or twisting the fiber within the exit die changes the ratio of polymer to fiber. As the rotation increases, the fiber concentration increases. Rotational speeds may vary from 0 to 10,000 rpm, preferably less than 600 rpm. Rotation speed and line speed define a lead or pitch, measured as inches per min/rev. per min (inches/revolution). At 0 rpm the pitch is infinite. The pitch may be between 0 and infinity, preferably between 0.001 to 1,000.

When the exit die is rotated, the shear stress and the shear rate are increased. The shear develops two components from the axial and tangential forces. The shear rate increases through vector addition of the velocity and the rotational speed. The corresponding shear stress sees the pulling force of the fiber combined with the rotational force or torque. Viscosity is defined as the shear stress divided by the shear rate. For pseudoplastic polymers the viscosity is lower at higher shear rates due to shear thinning. A shear rate range between 1 and 100,000 sec-1 would cover most cases. The rotation of the die orients the polymer chains which wrap around and compress the core resin and fiber. This strangulating effect creates a normal stress which improves fiber wet out and increases the fiber concentration. Rotation of the fiber (strand) in a stationary exit die using canted puller belts may have a similar effect as exit die rotation.

By controlling the exit die temperature it is possible to allow for cooling of the composite to occur in the helical zone while still imparting shear by rotation to strain and further orient the skin polymer. As shown in FIG. 4, the apparatus may be equipped with multiple exit dies, each connected for rotation with intermeshing gears to allow for more strands to be produced. In the configuration shown in FIG. 7, the exit die rotational direction alternates with each successive position. Clockwise and counterclockwise directions have the same effect on wet out and fiber concentration.

Figure 8:
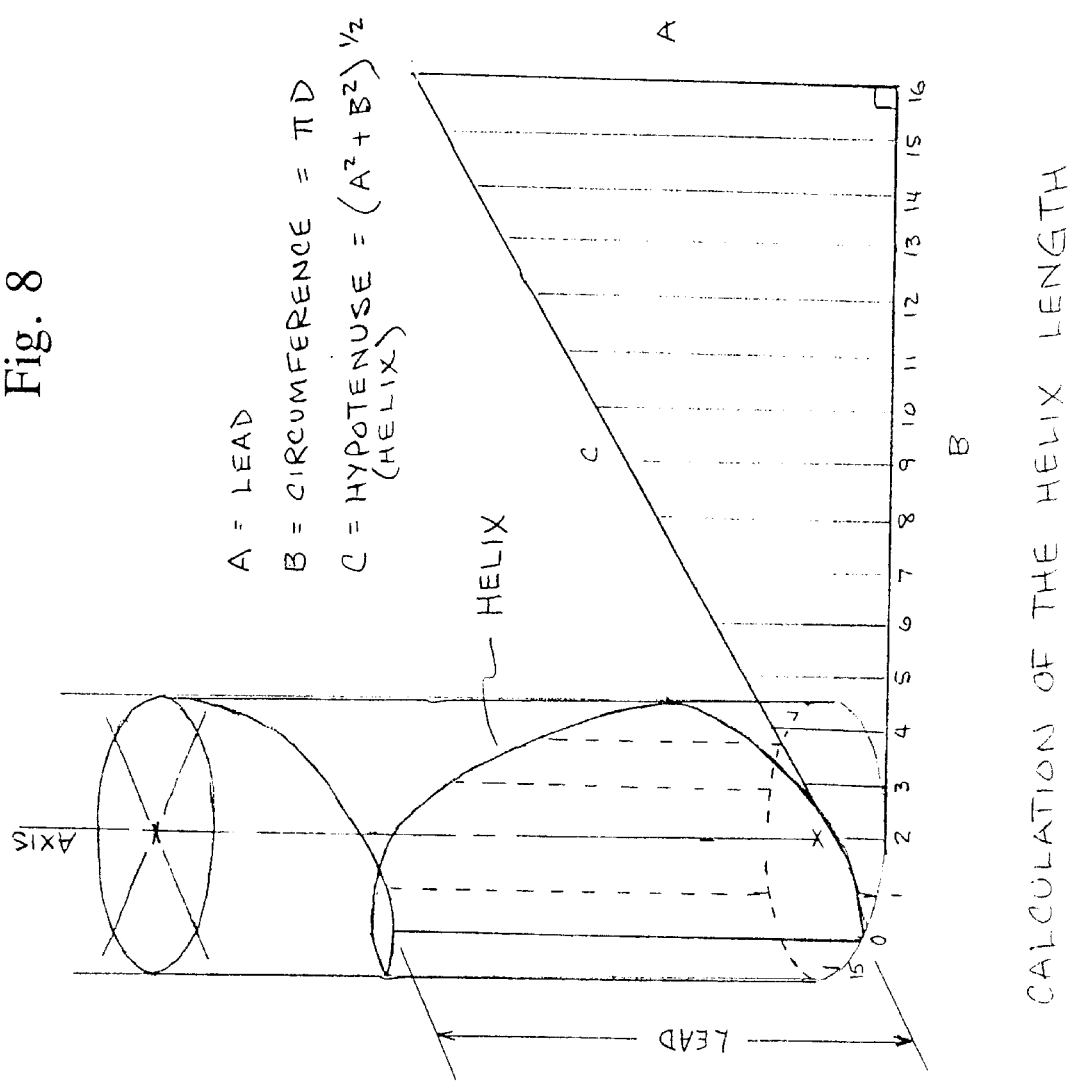
FIG. 8 is a graphical representation of how the helix length is calculated.

Polymer chains tend to align in the direction of shear and flow. The flow path of the polymer and the direction of the chain alignment are described by the helix shown in FIG. 8. By definition a helix is generated by a point moving around and along the surface of a cylinder or cone with a uniform angular velocity about the axis, and with a uniform linear velocity in the direction of the axis. The distance measured parallel to the axis traversed by the point in one revolution is called the lead or pitch. The ratio of line speed to rotation speed define the lead of the helix. Improved wet out, fiber dispersion, strand integrity, mechanical properties and higher fiber concentration are observed with increasing rotation speed at constant line speed (i.e. shorter lead).

The thermoplastic polymers may be crystalline, amorphous, or semicrystalline. The high molecular weight, high viscosity, thermoplastic polymers may include but are not limited to:

polyolefins such as PP, LDPE, and HDPE
polyamides such as nylon 6, nylon 66, nylon 46, Nylon 11
polyesters such as PET, PBT, PCT, and PTT, polyarylates
thermoplastic polyurethanes
PC, PEI, PES, PPS, PEEK, PVC, CPVC, PAI, POM, PS, PVA, PMMA,
PAEK, PAS, PI, PPO, PTFE Fiber roving may include glass, carbon, organic, and metal types of continuous or semicontinuous fiber.

An interesting feature of the invention is the change in fiber concentration which occurs as the rotation speed increases at a constant line speed. The mechanism for this may be a Weissenberg normal stress effect. This is a tendency for a viscoelastic fluid to flow in a direction normal to the shear stress. As the polymer chains are coiled about the axially directed fiber the strangulating effect would likely force polymer along the fixed core axis relative to the rotating wall of the cylinder. The normal stress flow direction is back into the die since the fiber concentration increases and the composite would offer resistance. The exit die restriction would also contribute to the back flow pressure.

The melt viscosity of the thermoplastic resin is influenced by molecular weight, temperature, and shear rate. A pseudo plastic, non-Newtonian polymer will experience shear thinning or viscosity reduction with increasing shear rate. A desirable feature of this invention is the increased shear rate induced by the exit die rotation which lowers the melt viscosity of high molecular weight thermoplastic. Fiber is easier to wet out with thermoplastic at lower melt viscosity.

In Volume I of Fluid Mechanics by Bird, Armstrong, and Hassager, p. 159, (TA357D95) a mathematical description of the shear rate for steady helical flow is proposed in which both the strand velocity and the rotational velocity contribute to the shear rate. The shear rate was estimated to be about 100 sec−1 at 0 rpm and 10,000 sec−1 at 600 rpm and viscosity varied from 500,000 cp to 10,000 cp in the trials with this invention.

Figure 9:
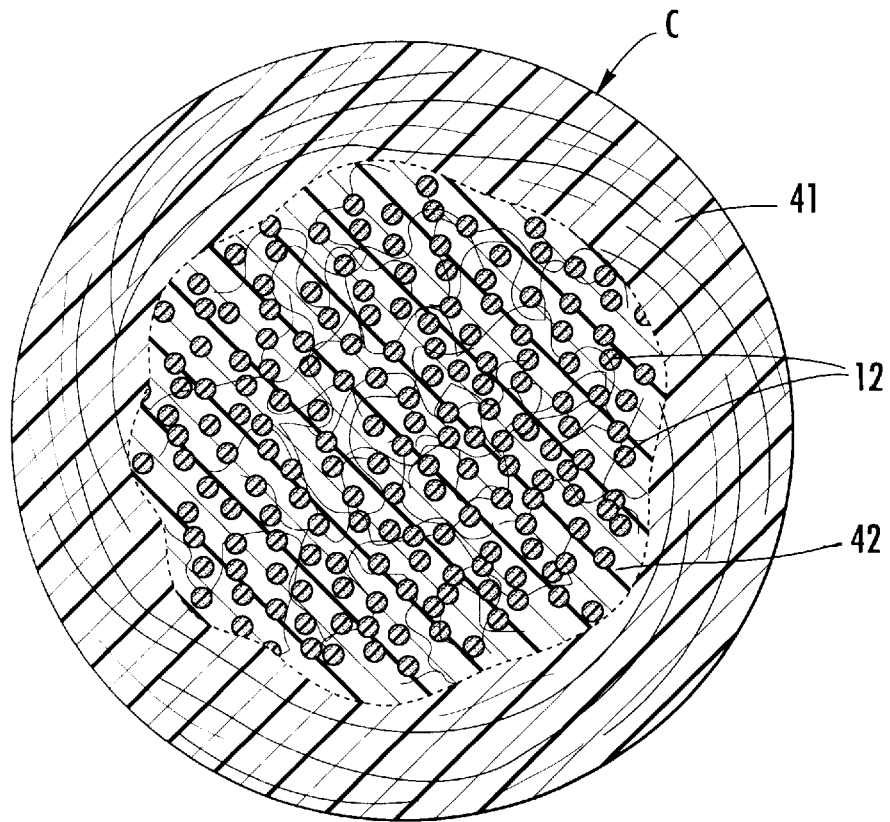
FIG. 9 is a cross-sectional illustration of a composite material formed according to the present invention.

Benefits of the composite material according to the present invention include a unidirectional fiber alignment for higher tensile strength, longer fiber length for improved stress transfer efficiency leading to higher modulus, and fewer fiber ends which reduce the number of stress risers and increase impact strength. As seen in FIG. 9, the composite material C is characterized by having a thermoplastic resin rich skin region 41 which surrounds a core region 42 containing unidirectionally aligned fibers 12 in a matrix of thermoplastic polymer. The smooth, resin rich skin region is created by the rotational effect at the die surface. In the skin region, the morphology of the polymer is characterized by the polymer molecules or chains being oriented or aligned along a helical path. The skin polymer is less crystalline and more amorphous than the core polymer. The skin allows long fiber pellets to be cut to shorter lengths without compromising (breaking open) the pellet form. The core polymer chains are generally aligned with the fiber. The skin region may constitute from 20 to 80% of the volume of the composite. The differences in the molecular orientation of the polymer chains in the skin region and in the core region may be ascertained by viewing the regions of the sample under polarized light using a polarizing filter. Birefringence measurements may also be employed.

Composite long fiber pellets made by rotation may be characterized by the length of fiber filaments being equal to or greater than the pellet length. The length of a pellet may range from 0.125 inches to about 1.0 inches and the diameter may range from about 0.125 to about 0.5 inches so that the aspect ratio (length/diameter) may range from 0.25 to 4.0. The number of glass fiber filaments range from 2,000 to 16,000 in a pellet and up to 65,000,000 in a profile.

The helical orientation of polymer chains wrapped around the core resin and fiber produce a unique structure. As the rotation speed increases there is greater strangulation of the core region. The boundary of the core becomes more distinctive and circular.

A distinctive feature of the composite, illustrated schematically in FIG. 9, is the smooth, resin rich surface created by the die rotation. As the exit die rotates a resin rich skin forms on the composite. The polymer impregnated fiber rovings are positioned in the core region of the composite. The core polymer is dragged by the fiber and oriented in the same direction as the fiber. The skin and core regions are distinctively formed. The skin forms a ring around the core while the core forms a circular shape. FIG. 10 shows the cross section of a composite illuminated with polarized light and magnified 10×. The sample from Run 656-1 contains two rovings made at 0 rpm. The rovings are formed into U shapes and the fiber concentration is 47.1 percent. The skin core area ratio of sample 656-1 is about 1.1. FIG. 11 shows the cross section of sample 656-4 made with two rovings at 320 rpm. Fiber concentration has increased to 59.2 percent. The core area ratio of sample 656-4 rpm is 0.65. Fiber loading may range from 5 to 80 percent by weight of the composite, more particularly 20 to 80 weight percent. Good results have been observed at fiber concentrations from 30.4 to 68.7 weight percent. The illumination of the skin under polarized light is much brighter, suggesting an amorphous polymer structure. The core is less bright, suggesting a more crystalline structure.

The structure of the skin consists of the helically aligned polymer chains and may generally occupy up to 60 percent of the cross section of the composite. Higher molecular weight polymers generally have longer polymer chains and are characterized by low melt flow rates (ASTM D1248). The longer chain polymers would have greater advantage in compressing the core. The polymer chains are drawn along the helix formed by the simultaneous exit die wall rotational drag and the axial drag by the fiber. The helical alignment of the skin polymer chains improves the inner laminar shear strength of the strand which allows long fiber pellets to be cut to short lengths without compromising and breaking open the pellets. The skin also provides lubricity which protects the fiber in a subsequent handling and molding and preserves fiber length.

By cooling the rotating exit die, some cooling of the strand may occur in the region of the rotating die. This increases orientation by dragging the solidifying resin at a temperature below the melting point. Polymers may be crystalline, amorphous, or both (semicrystalline) depending on the structural regularity. Condensation polymers such as polyamides and polyesters are crystalline. Addition type polymers such as polycarbonate and polyetherimide are amorphous. Polypropylene is semicrystalline. The cooling rate will influence the amount of crystallinity.

The fiber yield is defined as the length per unit weight in yards/lb. A typical E glass roving is 225 yards/lb. and contains about 4,000 filaments. The exit die rotation improves fiber dispersion and wet out and in turn allows for more fiber rovings to be incorporated into the composite. Increasing the number of rovings in a strand for long fiber pelletizing while holding the fiber concentration and line speed constant results in greater output and improved production economy. The yield (yd/lb.) of the fiber was varied from 225 to 56 in long fiber compounding. A range from 2,000 to 0.01 yd/lb. is desired. Both inside pull and outside pull fiber is applicable.

The dispersion pattern of fiber formed by the turning guide is transformed by the exit die rotation. The composite cross sections in FIGS. 10 and 11 show the rotational influence at 0 and 320 rpm on the fiber core. The U shape fiber pattern in FIG. 10 is transformed into a fuzzy, circular core of dispersed fiber and polymer in FIG. 11.

EXAMPLES

Figure 12:
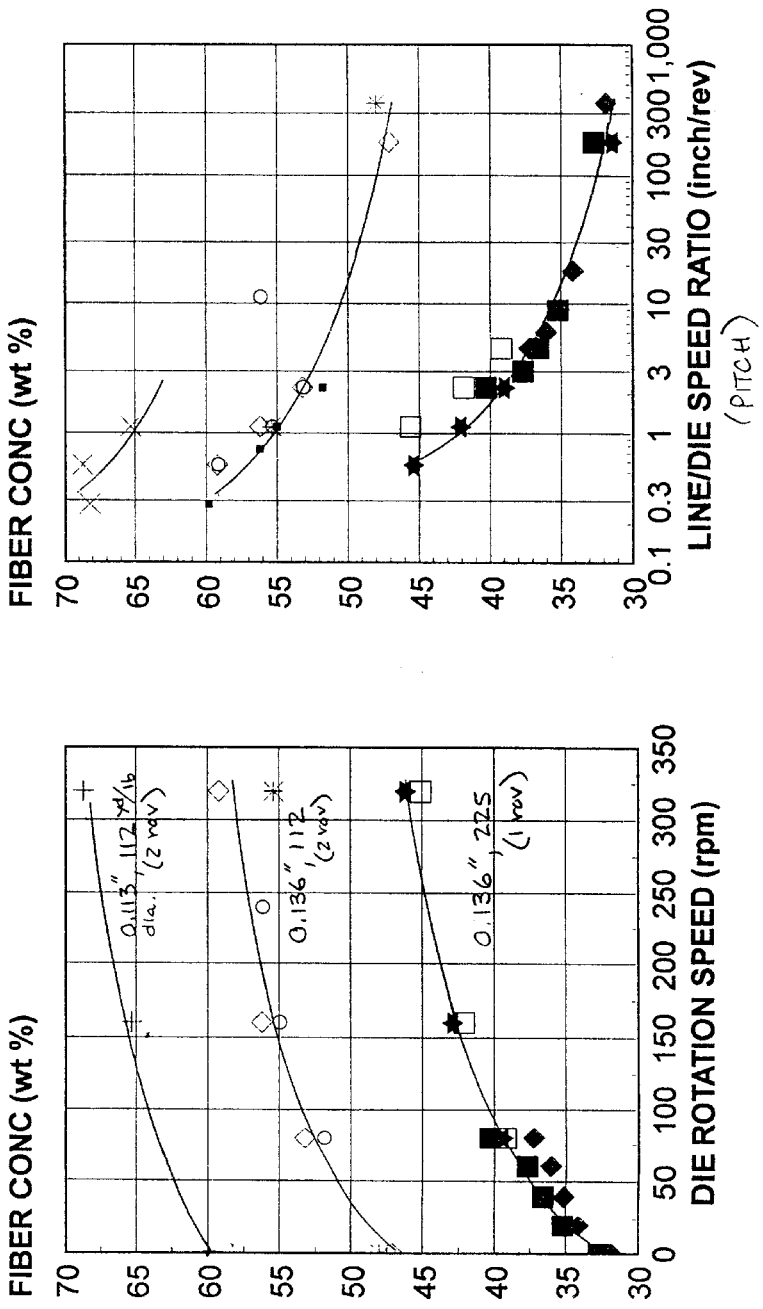
FIGS. 12–14 are graphs showing the effect of die rotation and other factors on the properties of the composite material.
Figure 13:
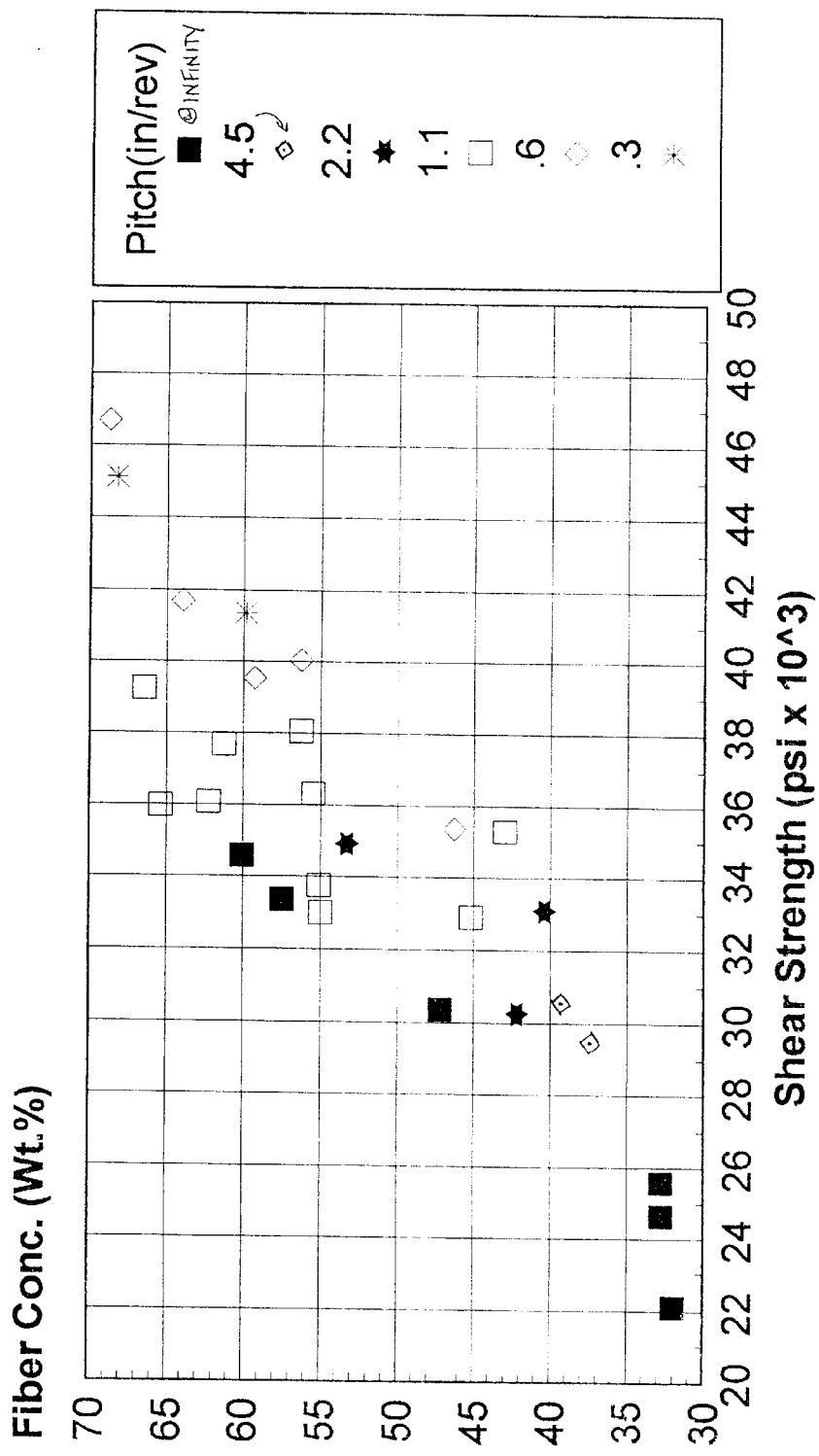
Figure 14:
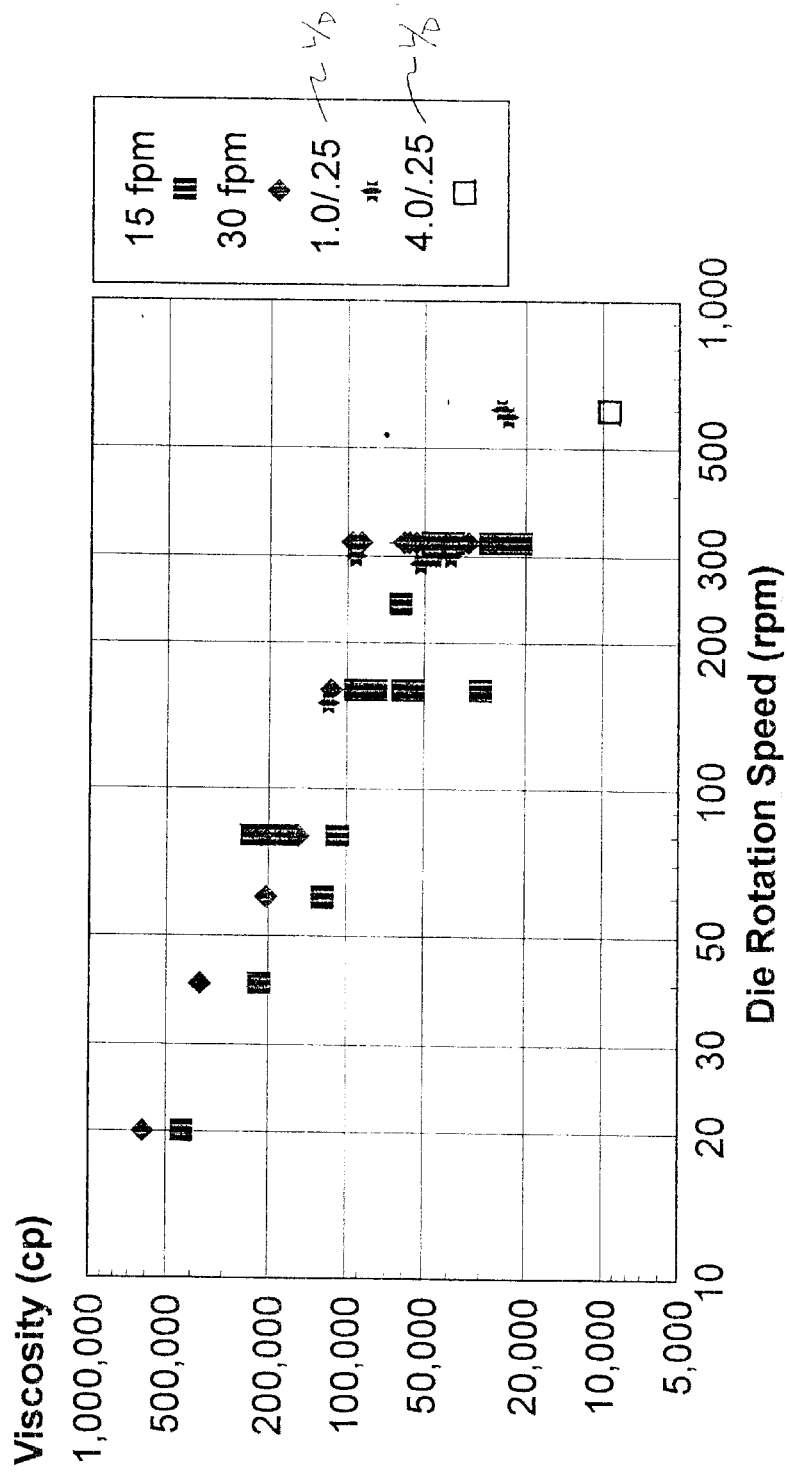

A series of experiments was performed to study the effects of rotation on the composite properties. A summary of the data is shown in Table 1. The relationships between fiber concentration, rotational speed, pitch, and shear strength are shown in FIGS. 12 and 13. A relationship between melt viscosity and rotation speed is shown in FIG. 14.

Table 1 shows the relationship between the process conditions of fiber yield, exit die diameter, line speed, and rotation speed on fiber concentration, shear strength, and viscosity for polypropylene and glass fiber. Long fiber pellets were produced with 1, 2, and 4 rovings at 0.113, 0.136, and 0.250 inch hole sizes. Die rotation was varied from 0 to 600 rpm.

The influence of rotation speed and the ratio of line speed to rotation speed (i.e. lead or pitch) on fiber concentration was plotted in the graph of FIG. 12. The fiber concentration was measured with an ashing furnace. Shear strength measurements were made on composite strands using an Instron tensile tester according to ASTM D 512. The change in shear strength of the composite at similar fiber concentrations was plotted in the graph of FIG. 13. The melt viscosity of the polypropylene was estimated from the pressure, exit die geometry, line speed, and rotation speed and plotted in the graph of FIG. 14.

Run No.

652. A comparison was made between a stationary die and a die rotated at 80 rpm. Fiber concentration increased from 30.4 to 37.4 percent.

653. The die was rotated from 0 to 80 rpm in increments of 20 rpm. Fiber increase from 32.7 to 40.3.

654. Line speed was doubled to 30 fpm. Die speed was increased from 0 to 80 rpm. Fiber content increased from 31.9 to 37.3 percent.

655. Line speed was evaluated at 15 and 30 fpm. Die speed was increased from 0 to 320 rpm. Fiber increased from 32.7 to 46.2 percent at 15 fpm from 0 to 320 rpm. Fiber increased to 45.1% at 30 fpm, 320 rpm.

656. Fiber yield was changed from 225 to 112 yd/lb. by running two rovings. Die speed was increased from 0 to 320 rpm at 15 fpm. Fiber concentration increased from 47.1 to 59.2 percent. Doubling line speed to 30 fpm reduced fiber concentration to 55.4 percent at 320 rpm confirming the inter relation of line speed and rotation speed.

657. Clockwise and counterclockwise rotations were evaluated. No difference was observed.

659, 660. Die land length was varied from 0.7 to 1.2 inches for a 0.113 inch diameter. L/D ratios were 6.2 and 10.6. Increasing the L/D ratio generally increased fiber concentration and shear strength.

674, 675, 676. Die hole diameter was increased to 0.250 inches and the number of rovings was increased to 4. Land lengths of 1 and 4 inches were evaluated. Rotational speed was increased to 600 rpm. Fiber concentration increased from 34.0 to 45.7% in Run 674.

While particular embodiments of the invention have been described, it will be understood, of course, the invention is not limited thereto since modifications may be made by those skilled in the art, particularly in light of the foregoing teachings. It is therefore, contemplated by the appended claims to cover any such modifications that incorporate those features of these improvements in the true spirit and scope of the invention.

TABLE 1

DIE ROTATION TRIAL SUMMARY

26 Aug 96

| Run No. | ID | Dir. | Linespd (fpm) | Rotation (rpm) | Pitch (in/rev) | Yield (yd/lb) | Ash (wt %) | Dia (cal) (in) | Area (sq in) | Die Hole (in) | Die Land (in) | L/D | Pres (psi) | Visc (cp) | Load (lbs) | Pk Stres (psi) | Mod (psi) $\times 10^{-6}$ | Strain (%) |
|---|---|---|---|---|---|---|---|---|---|---|---|---|---|---|---|---|---|---|
| 652 | 1 | CW | 15 | 0 |  | 225 | 30.4 | 0.1148 | 0.01035 | 0.136 | 0.60 | 4.4 | 36 |  |  |  |  |  |
|  | 2 | CW | 15 | 80 | 2.25 | 225 | 37.4 | 0.1004 | 0.00792 | 0.136 | 0.60 | 4.4 | 34 | 173,891 |  |  |  |  |
| 653 | 1 | CW | 15 | 0 |  | 225 | 32.7 | 0.1096 | 0.00943 | 0.136 | 0.60 | 4.4 | 18 |  |  | 24,666 | 1.36 | 2.93 |
|  | 2 | CW | 15 | 20 | 9.00 | 225 | 35.2 | 0.1045 | 0.00858 | 0.136 | 0.60 | 4.4 | 21 | 429,613 |  |  |  |  |
|  | 3 | CW | 15 | 40 | 4.50 | 225 | 36.6 | 0.1019 | 0.00816 | 0.136 | 0.60 | 4.4 | 21 | 214,806 |  |  |  |  |
|  | 4 | CW | 15 | 60 | 3.00 | 225 | 37.7 | 0.0999 | 0.00784 | 0.136 | 0.60 | 4.4 | 18 | 122,746 |  |  |  |  |
|  | 5 | CW | 15 | 80 | 2.25 | 225 | 40.3 | 0.0955 | 0.00716 | 0.136 | 0.60 | 4.4 | 21 | 107,403 |  | 33,103 | 1.49 | 2.82 |
| 654 | 6 | CW | 30 | 0 |  | 225 | 31.9 | 0.1113 | 0.00973 | 0.136 | 0.60 | 4.4 | 36 |  | 215.3 | 22,124 | 0.91 | 3.71 |
|  | 7 | CW | 30 | 20 | 18.00 | 225 | 34.2 | 0.1065 | 0.00891 | 0.136 | 0.60 | 4.4 | 30 | 613,732 | 250.2 | 28,088 | 1.24 | 3.48 |
|  | 8 | CW | 30 | 40 | 9.00 | 225 | 35.2 | 0.1045 | 0.00858 | 0.136 | 0.60 | 4.4 | 30 | 368,239 | 233.2 | 27,183 | 1.33 | 3.26 |
|  | 9 | CW | 30 | 60 | 6.00 | 225 | 36.1 | 0.1028 | 0.00830 | 0.136 | 0.60 | 4.4 | 30 | 204,577 | 255.9 | 30,832 | 1.54 | 3.12 |
|  | 10 | CW | 30 | 80 | 4.50 | 225 | 37.3 | 0.1006 | 0.00795 | 0.136 | 0.60 | 4.4 | 30 | 153,433 | 234.7 | 29,525 | 1.52 | 3.14 |
| 655 | 1 | CW | 15 | 0 |  | 225 | 32.7 | 0.1096 | 0.00943 | 0.136 | 0.60 | 4.4 | 36 |  | 241.5 | 25,600 | 1.29 | 241 |
|  | 2 | CW | 15 | 80 | 2.25 | 225 | 39.4 | 0.0970 | 0.00739 | 0.136 | 0.60 | 4.4 | 33 | 168,776 |  |  |  |  |
|  | 3 | CW | 15 | 160 | 1.13 | 225 | 42.9 | 0.0915 | 0.00658 | 0.136 | 0.60 | 4.4 | 30 | 76,717 | 232.2 | 35,309 | 1.75 | 2.69 |
|  | 4 | CW | 15 | 320 | 0.56 | 225 | 46.2 | 0.0868 | 0.00592 | 0.136 | 0.60 | 4.4 | 30 | 38,358 | 209.3 | 35,370 | 1.70 | 2.55 |
|  | 5 | CW | 30 | 320 | 1.13 | 225 | 45.1 | 0.0883 | 0.00612 | 0.136 | 0.60 | 4.4 | 42 | 53,702 | 201.6 | 32,914 | 1.74 | 2.02 |
|  | 6 | CW | 30 | 160 | 2.25 | 225 | 42.1 | 0.0927 | 0.00675 | 0.136 | 0.60 | 4.4 | 45 | 115,075 | 204.3 | 30,266 | 1.41 | 2.83 |
|  | 7 | CW | 30 | 80 | 4.50 | 225 | 39.2 | 0.0973 | 0.00744 | 0.136 | 0.60 | 4.4 | 42 | 214,806 | 227.5 | 30,597 | 1.50 | 2.73 |
| 656 | 1 | CW | 15 | 0 |  | 112 | 47.1 | 0.1214 | 0.01158 | 0.136 | 0.60 | 4.4 | 42 |  | 351.6 | 30,377 | 1.89 | 2.59 |
|  | 2 | CW | 15 | 80 | 2.25 | 112 | 53.2 | 0.1108 | 0.00964 | 0.136 | 0.60 | 4.4 | 36 | 184,120 | 336.8 | 34,933 | 1.70 | 3.51 |
|  | 3 | CW | 15 | 160 | 1.13 | 112 | 56.2 | 0.1062 | 0.00886 | 0.136 | 0.60 | 4.4 | 36 | 92,060 | 337.3 | 38,082 | 2.15 | 3.25 |
|  | 4 | CW | 15 | 320 | 0.56 | 112 | 59.2 | 0.1018 | 0.00814 | 0.136 | 0.60 | 4.4 | 36 | 46,030 | 321.9 | 39,550 | 1.98 | 3.06 |
|  | 5 | CW | 30 | 320 | 1.13 | 112 | 55.4 | 0.1074 | 0.00906 | 0.136 | 0.60 | 4.4 | 69 | 88,224 | 329.2 | 36,336 | 1.97 | 3.17 |
| 657 | 1 | CCW | 15 | 80 | 2.25 | 112 | 51.8 | 0.1131 | 0.01005 | 0.136 | 0.60 | 4.4 | 45 | 230,150 |  |  |  |  |
|  | 2 | CCW | 15 | 80 | 2.25 | 112 | 51.9 | 0.1130 | 0.01003 | 0.136 | 0.60 | 4.4 | 39 | 199,463 |  |  |  |  |
|  | 3 | CCW | 15 | 240 | 0.75 | 112 | 56.2 | 0.1062 | 0.00886 | 0.136 | 0.60 | 4.4 | 36 | 61,373 | 354.8 | 40,050 | 2.51 | 2.88 |
|  | 4 | CCW | 15 | 160 | 1.13 | 112 | 55.0 | 0.1080 | 0.00916 | 0.136 | 0.60 | 4.4 | 36 | 92,060 | 309.4 | 33,772 | 2.38 | 2.14 |
|  | 5 | CCW | 30 | 320 | 1.13 | 112 | 54.9 | 0.1082 | 0.00920 | 0.136 | 0.60 | 4.4 | 75 | 95,896 | 303.6 | 33,015 | 2.30 | 2.66 |
|  | 6 | CCW | 7.5 | 320 | 0.28 | 112 | 59.8 | 0.1010 | 0.00801 | 0.136 | 0.60 | 4.4 | 18 | 23,015 | 331.5 | 41,376 | 1.92 | 2.79 |
| 659 | 1 | CCW | 15 | 0 |  | 112 | 60.0 | 0.1007 | 0.00796 | 0.113 | 1.20 | 10.6 | 45 |  | 275.5 | 34,586 | 2.07 | 2.85 |
|  | 2 | CCW | 15 | 160 | 1.13 | 112 | 65.3 | 0.0937 | 0.00690 | 0.113 | 1.20 | 10.6 | 28 | 29,746 | 361.0 | 35,999 | 1.93 | 3.03 |
|  | 3 | CCW | 15 | 320 | 0.56 | 112 | 68.7 | 0.0896 | 0.00631 | 0.113 | 1.20 | 10.6 | 39 | 20,716 | 294.5 | 46,708 | 1.52 | 2.71 |
|  | 4 | CCW | 7.5 | 320 | 0.28 | 112 | 68.2 | 0.0902 | 0.00639 | 0.113 | 1.20 | 10.6 | 24 | 12,748 | 288.4 | 45,137 | 2.86 | 2.42 |
|  | 5 | CCW | 30 | 320 | 1.13 | 112 | 66.4 | 0.0924 | 0.00671 | 0.113 | 1.20 | 10.6 | 63 | 33,465 | 263.3 | 39,265 | 2.44 | 2.84 |
| 660 | 1 | CCW | 15 | 0 |  | 112 | 57.4 | 0.1044 | 0.00856 | 0.113 | 0.7 | 6.2 | 36 |  | 285.6 | 33,366 | 2.00 | 2.65 |
|  | 2 | CCW | 15 | 160 | 1.13 | 112 | 61.2 | 0.0991 | 0.00771 | 0.113 | 0.7 | 6.2 | 33 | 60,100 | 290.8 | 37,699 | 2.27 | 2.81 |
|  | 3 | CCW | 15 | 320 | 0.56 | 112 | 63.9 | 0.0955 | 0.00716 | 0.113 | 0.7 | 6.2 | 30 | 27,318 | 299.0 | 41,712 | 2.61 | 2.72 |
|  | 4 | CCW | 30 | 320 | 1.13 | 112 | 62.2 | 0.0977 | 0.00750 | 0.113 | 0.7 | 6.2 | 63 | 57,368 | 270.6 | 36,095 | 2.26 | 2.93 |
|  | 5 | CW | 30 | 320 | 1.13 | 112 | 61.9 | 0.0981 | 0.00756 | 0.113 | 0.7 | 6.2 | 66 | 60,100 |  |  |  |  |
|  | 6 | CW | 15 | 320 | 0.56 | 112 | 63.7 | 0.0956 | 0.00718 | 0.113 | 0.7 | 6.2 | 30 | 27,318 |  |  |  |  |
|  | 7 | CW | 15 | 160 | 1.13 | 112 | 61.3 | 0.0989 | 0.00768 | 0.113 | 0.7 | 6.2 | 30 | 54,636 |  |  |  |  |
| 674 | 1 | CCW | 13.3 | 300 | 0.53 | 56 | 43.6 |  |  | 0.250 | 1.00 | 4.0 | 30 | 45,127 |  |  |  |  |
|  | 2 | CCW | 14.6 | 0 |  | 56 | 38.5 | 0.0000 | 0.00000 | 0.250 | 1.00 | 4.0 | 22 |  |  |  |  |  |
|  | 3 | CCW | 14.6 | 150 | 1.17 | 56 | 34.0 | 0.0000 | 0.00000 | 0.250 | 1.00 | 4.0 | 39 | 117,331 |  |  |  |  |
|  | 4 | CCW | 14.4 | 300 | 0.58 | 56 | 34.8 | 0.0000 | 0.00000 | 0.250 | 1.00 | 4.0 | 61 | 92,210 |  |  |  |  |
|  | 5 | CCW | 14.5 | 300 | 0.58 | 56 | 42.3 | 0.0000 | 0.00000 | 0.250 | 1.00 | 4.0 | 31 | 46,632 |  |  |  |  |

TABLE 1-continued

DIE ROTATION TRIAL SUMMARY

| Run No. | ID | Dir. | Linespd (fpm) | Rotation (rpm) | Pitch (in/rev) | Yield (yd/lb) | Ash (wt %) | Dia (cal) (in) | Area (sq in) | Die Hole (in) | 26 Aug 96 Die Land (in) | L/D | Pres (psi) | Visc (cp) | Load (lbs) | Pk Stres (psi) | Mod (psi) ×10⁻⁶ | Strain (%) |
|---|---|---|---|---|---|---|---|---|---|---|---|---|---|---|---|---|---|---|
|  | 6 | CCW | 14.5 | 300 | 0.58 | 56 | 45.7 | 0.0000 | 0.00000 | 0.250 | 1.00 | 4.0 | 26 | 39,110 |  |  |  |  |
| 675 | 1 | CCW | 20 | 580 | 0.41 | 56 | 38.6 | 0.0000 | 0.00000 | 0.25 | 1 | 4.0 | 45 |  |  |  |  |  |
|  | 2 | CCW | 20 | 580 | 0.41 | 56 | 42.6 | 0.0000 | 0.00000 | 0.25 | 1 | 4.0 | 30 | 23,342 |  |  |  |  |
|  | 3 | CCW | 20 | 290 | 0.83 | 56 | 38.6 | 0.0000 | 0.00000 | 0.25 | 1 | 4.0 | 33 | 51,352 |  |  |  |  |
|  | 4 | CCW | 9.2 | 600 | 0.18 | 56 | 35.5 | 0.0000 | 0.00000 | 0.25 | 1 | 4.0 | 33 | 24,820 |  |  |  |  |
| 676 | 1 | ccw | 24 | 568 | 0.51 | 56 | 51.4 | 0.0000 | 0.00000 | 0.25 | 4 | 16.0 | 43 | 8,541 |  |  |  |  |
|  | 2 | ccw | 16.5 | 608 | 0.33 | 56 | 50.6 | 0.0000 | 0.00000 | 0.25 | 4 | 16.0 | 43 | 7,979 |  |  |  |  |
|  | 3 | ccw | 18 | 600 | 0.36 | 56 | 58.9 | 0.0000 | 0.00000 | 0.25 | 4 | 16.0 | 54 | 10,116 |  |  |  |  |
|  | 4 | ccw | 18 | 600 | 0.36 | 56 | 57.3 | 0.0000 | 0.00000 | 0.25 | 4 | 16.0 | 52 | 9,721 |  |  |  |  |
|  | 5 | ccw | 18 | 600 | 0.36 | 56 | 47.8 | 0.0000 | 0.00000 | 0.25 | 4 | 16.0 | 54 | 10,154 |  |  |  |  |
|  | 6 | ccw | 24 | 600 | 0.48 | 56 | 48.1 | 0.0000 | 0.00000 | 0.25 | 4 | 16.0 | 54 | 10,154 |  |  |  |  |

That which is claimed is:

1. A fiber reinforced thermoplastic material comprising a core region including a plurality of unidirectionally aligned fibers which are substantially fully impregnated with a thermoplastic polymer and a skin region including the thermoplastic polymer which is substantially free of said fibers, the polymer chains in said core region being substantially aligned with said fibers and the polymer chains in said skin region being substantially helically arranged about said core region.

2. A material according to claim 1 wherein said fibers are formed of a material from the group consisting of glass, carbon, metal and organic polymer.

3. A material according to claim 1 wherein the fibers comprises between 5% to 80% by weight of the material.

4. A material according to claim 1 wherein said skin region comprises 20% to 80% of volume of said material.

5. A material according to claim 1 wherein said core region includes a fiber concentration of at least 48% by weight.

6. A material according to claim 1 which is in the form of a long fiber pellet or an elongate profile.

7. A method for producing a fiber reinforced thermoplastic material having a core region containing unidirectionally aligned fibers and a skin region substantially free of said fibers, the method comprising:
  directing continuous filaments along a predetermined advancing path of travel into and through an impregnation chamber;
  directing molten thermoplastic polymer material from an extruder into the impregnation chamber and into intimate contact with the advancing fiber for wetting and impregnating the filaments with the molten thermoplastic material; and
  pulling the polymer impregnated filaments from the impregnation chamber through an exit die while imparting relative rotation between the exit die and the filaments therethrough, wherein said material produced contains polymer chains in said skin region being substantially helically arranged about said core region.

8. A method according to claim 7 wherein said step of directing the polymer into the impregnation chamber comprises directing the polymer through the impregnation chamber in opposing countercurrent direction to the advancing filaments and in intimate contact with the advancing filaments.

9. A method according to claim 8 further comprising the step of advancing the filaments downward through the chamber while directing the flow of thermoplastic material in an upward direction, counter-current to the advancing filaments.

10. A method according to claim 7 comprising the step of maintaining tension in the advancing filaments in the impregnation passageway as it contacts the molten thermoplastic.

11. A method according to claim 7 wherein the step of imparting relative rotation comprises rotating the exit die about the axis of the advancing filaments.

12. A method according to claim 7 wherein the step of imparting relative rotation comprises rotating the advancing polymer impregnated filaments at a location downstream of the exit die.

13. A method according to claim 7 wherein said exit die is provided with a conical entrance and a cylindrical exit.

14. A method according to claim 7 wherein the conical entrance of the exit die has a length to diameter ratio of 0.01 to 1000.

15. A method according to claim 14 wherein the length to diameter ratio is between 4.4 and 16.

16. A method according to claim 7 further comprising the step of engaging and turning the advancing filaments through a predetermined angle while in the impregnation chamber to squeeze the fiber and thermoplastic material together.

17. A method according to claim 7 wherein the exit die includes a restricted die opening of predetermined size for metering the molten polymer onto the polymer impregnated fiber, the predetermined size of the die opening being selected to provide a ratio of thermoplastic polymer to filaments in the range of about 0.25 to 1.0 to about 4.0 to 1.0.

18. A method according to claim 7 wherein the exit die rotates at a predetermined rotation speed and the fiber is advanced at a predetermined line speed, said predetermined rotation speed and line speed defining a pitch between 0.001 and 1,000.

19. A method according to claim 7 wherein the step of rotating the exit die includes rotating the exit die from 0.001 rpm to 10,000 rpm.

20. A method according to claim 7 further comprising twisting the polymer impregnated filaments after they exit the rotating exit die.

21. A solid fiber reinforced thermoplastic material comprising a core region including a plurality of fibers unidirectionally aligned along an axis and imbedded in a thermoplastic polymer compound, and a skin region comprising thermoplastic polymer, said skin region is substantially free of said aligned fibers, wherein said polymer in said skin region is oriented helically relative to said axis.

22. A material according to claim 21 wherein said fibers are formed from a material from the group consisting of glass, carbon, metal and fiber-grade thermoplastic polymer.

23. A material according to claim 22 wherein the amount of fibers relative to the polymer is in a ratio between 4% and 80% by weight.

24. A material according to claim 21 which is in the form of a pellet or elongated profile.

25. A process for using the fiber reinforced thermoplastic material of claim 1 to make an injection molding or to make a profile, comprising incorporating said material into said molding or profile.

* * * * *